United States Patent
Terleski

(10) Patent No.: US 9,047,644 B1
(45) Date of Patent: Jun. 2, 2015

(54) PROVIDING CONTEXT FOR A SOCIAL GRAPH ADDITION

(75) Inventor: Jonathan Terleski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/493,924

(22) Filed: Jun. 11, 2012

(51) Int. Cl.
    *G06F 15/16* (2006.01)
    *G06Q 50/00* (2012.01)
    *H04L 12/58* (2006.01)

(52) U.S. Cl.
    CPC ............... *G06Q 50/01* (2013.01); *H04L 51/32* (2013.01); *H04L 12/588* (2013.01)

(58) Field of Classification Search
    CPC ..... H04L 43/045; H04L 51/32; H04L 12/588; G06Q 50/01
    USPC ............................... 705/319; 706/45; 709/206
    See application file for complete search history.

(56) References Cited

U.S. PATENT DOCUMENTS

| | | | | |
|---|---|---|---|---|
| 2012/0303703 | A1* | 11/2012 | Richter et al. | 709/204 |
| 2013/0036230 | A1* | 2/2013 | Bakos | 709/227 |
| 2013/0073983 | A1* | 3/2013 | Rasmussen et al. | 715/753 |
| 2013/0254303 | A1* | 9/2013 | Cheng et al. | 709/206 |

* cited by examiner

*Primary Examiner* — Larry Donaghue
(74) *Attorney, Agent, or Firm* — Lowenstein Sandler LLP

(57) ABSTRACT

In one aspect, a method for providing context regarding an addition to a social graph is provided. The method initiates with processing a request from a first user to add a second user to a social graph of the first user. A context that identified the second user to the first user is identified, the context defined by an activity of the second user preceding the request to add the second user to the social graph of the first user. A message is generated for the second user describing the processed request and containing information based on the context that identified the second user to the first user.

24 Claims, 12 Drawing Sheets

PROVIDING CONTEXT FOR A SOCIAL GRAPH ADDITION

BACKGROUND

The present disclosure relates to methods, systems, and computer programs for providing contextual information to a user who has been added to another user's social graph.

In recent years, social networks have gained in popularity amongst internet users. Social networks enable users to hold representative accounts, and designate connections to other account holders, which may include friends or family members on the same social network. These connections determine a user's social graph, which defines the user and the others with whom the user is connected on the social network. Users can conduct a variety of activities based on their social graph, including sharing information and media with others, receiving updates from others, commenting on posted information, playing games, chatting, etc.

In certain social networks a first user who wishes to add a second user to their social graph may send a request to the second user making their intentions known. The second user may then accept or reject/ignore the request from the first user. In some systems, when the request is accepted, then a mutual addition occurs wherein the second user is added to the first user's social graph and the first user is added to the second user's social graph as well. In other systems, the addition of the second user to the first user's social graph does not necessarily require the reciprocal addition of the first user to the second user's social graph. In some social networks, it can be possible for the first user to add the second user to their social graph without requiring the second user's permission. In such a scenario, the social graph addition mechanism can likewise be configured so that addition of the second user to the first user's social graph occurs without the reciprocal addition of the first user to the second user's social graph.

SUMMARY

Implementations of the present disclosure provide methods, systems, and computer programs for providing context regarding an addition to a social graph. It should be appreciated that the present disclosure can be implemented in numerous ways, e.g., a process, an apparatus, a system, a device or a method on a computer readable medium. Several implementations of the present disclosure are described below.

In accordance with some implementations, a method for providing context regarding an addition to a social graph is provided. The method includes method operations of processing a request from a first user to add a second user to a social graph of the first user; determining a context that identified the second user to the first user, the context defined by an activity of the second user preceding the request to add the second user to the social graph of the first user; and generating a message for the second user describing the processed request and containing information based on the context that identified the second user to the first user.

In some implementations, processing the request includes adding the second user to the social graph of the first user in response to receiving the request.

In some implementations, the context defines an activity of the second user on a network-accessible property; and the message identifies the network-accessible property or the activity of the second user on the network-accessible property.

In some implementations, the network-accessible property is an Internet website.

In some implementations, the method includes determining activity of the first user from the network-accessible property to an event initiating the request to add the second user, the determined activity enabling the determination of the context.

In some implementations, generating the message includes associating the message with a social networking account of the second user.

In some implementations, the context defines one or more of a comment posted by the second user, a review posted by the second user, a location of the second user.

In some implementations, the context is defined by an activity of the first user preceding the request to add the second user to the social graph of the first user.

In accordance with some implementations, a non-transitory computer-readable medium having program instructions embodied thereon for providing context regarding an addition to a social graph is provided. The program instructions include the following: program instructions for processing a request from a first user to add a second user to a social graph of the first user; program instructions for determining a context that identified the second user to the first user, the context defined by an activity of the second user preceding the request to add the second user to the social graph of the first user; and program instructions for generating a message for the second user describing the processed request and containing information based on the context that identified the second user to the first user.

In another implementation, a system for providing context regarding an addition to a social graph is provided. The system includes a social graph editor configured to process a request from a first user to add a second user to a social graph of the first user. A context identification module is configured to determine a context that identified the second user to the first user, the context defined by an activity of the second user preceding the request to add the second user to the social graph of the first user. And a notification module is configured to generate a message for the second user describing the processed request and containing information based on the context that identified the second user to the first user.

These and other implementations may provide one or more of the following advantages. Various implementations provide for a primary user to add a secondary user to the primary user's social graph, and provide context of the addition to the secondary user via a message. In this manner, though the secondary user may not know the primary user apart from the event of the social graph addition, the secondary user can nonetheless understand the context of the social graph addition, and therefore gain an understanding of the primary user's motive or reasons for adding the secondary user to his/her social graph. The context may be defined to varying degrees of specificity, and may identify a property visited by the primary user, specific content defined by the secondary user with which the primary user interacted, etc. Accordingly, the secondary user can gain an understanding of what types of content cause primary users to add the secondary user to their social graphs.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following implementations describe methods, computer programs, and systems for providing context regarding an addition to a social graph.

It will be apparent, that the present implementations may be practiced without some or all of these specific details.

Figure 1:
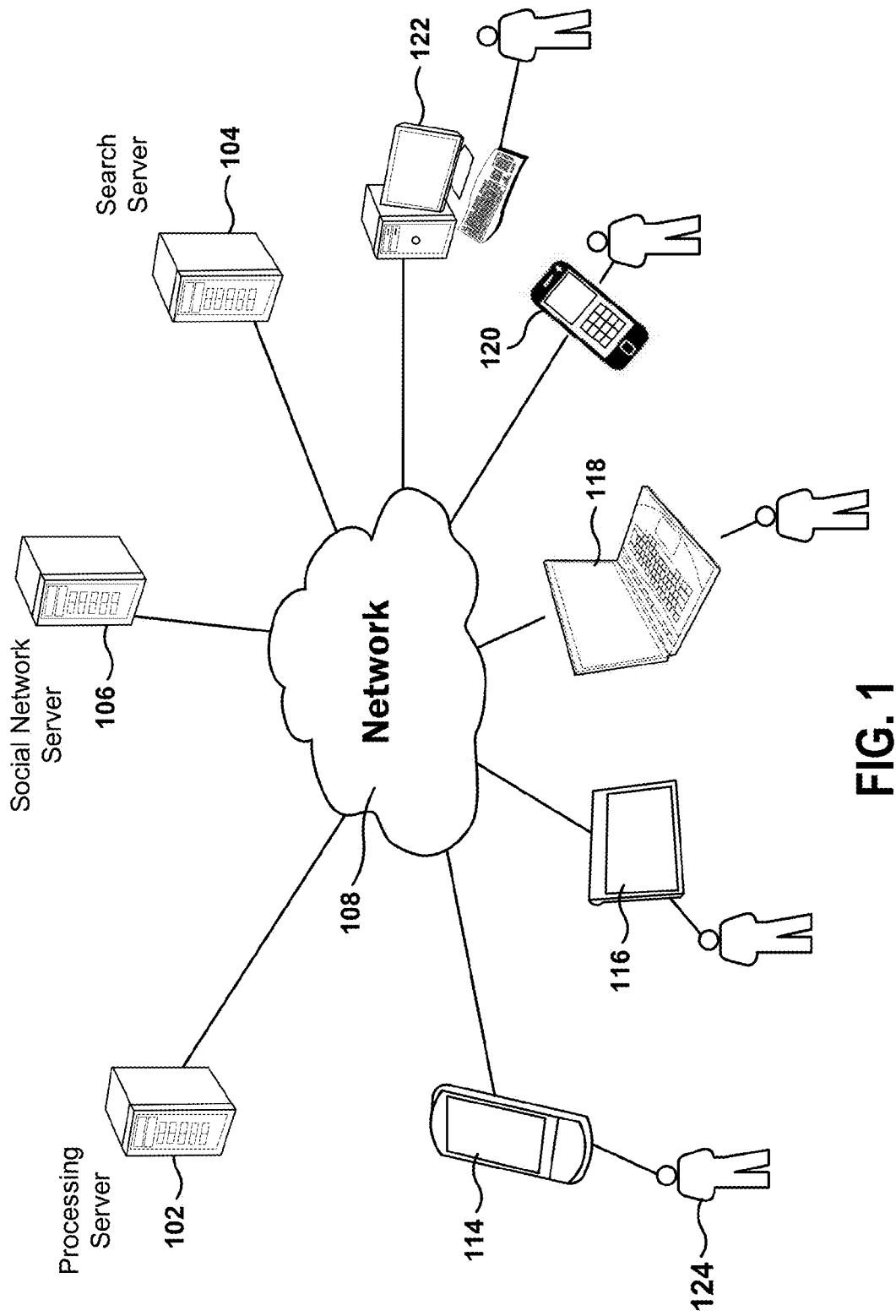
FIG. 1 illustrates an example architecture of a system for implementing implementations of the disclosure, in accordance with implementations of the present disclosure.

FIG. 1 provides one example architecture of a system that may utilize implementations described herein. Users 124 interact with each other in the context of a social network, where users can include real people and entities. Each user has an account in the social network, and the account includes at least a user name. In addition, each account can include a profile of the user with additional information about the user, e.g., birth date, residence, favorite activities, etc. The user is in control of what information is added to the profile, and what information is shared with others. A user may access the social network through different devices, e.g., a smart phone 114, a tablet computer 116, a laptop 118, a mobile phone 120, a personal computer 122, or any computing device that provides access to the Internet. Of course, the illustrated devices are only examples.

In accordance with some implementations, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In some implementations, the relationships established in the social network may be utilized in other contexts. Processing server 102 can be configured to perform various additional functions related to the social network, e.g., executing applications which run within the social networking environment, or processing data relating to external sites which have integrated social functionality. Search server 104 provides Internet search capabilities.

It is noted that the implementations illustrated in FIG. 1 are exemplary. Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 1 should therefore not be interpreted to be exclusive or limiting, but rather exemplary or illustrative.

Figure 2:
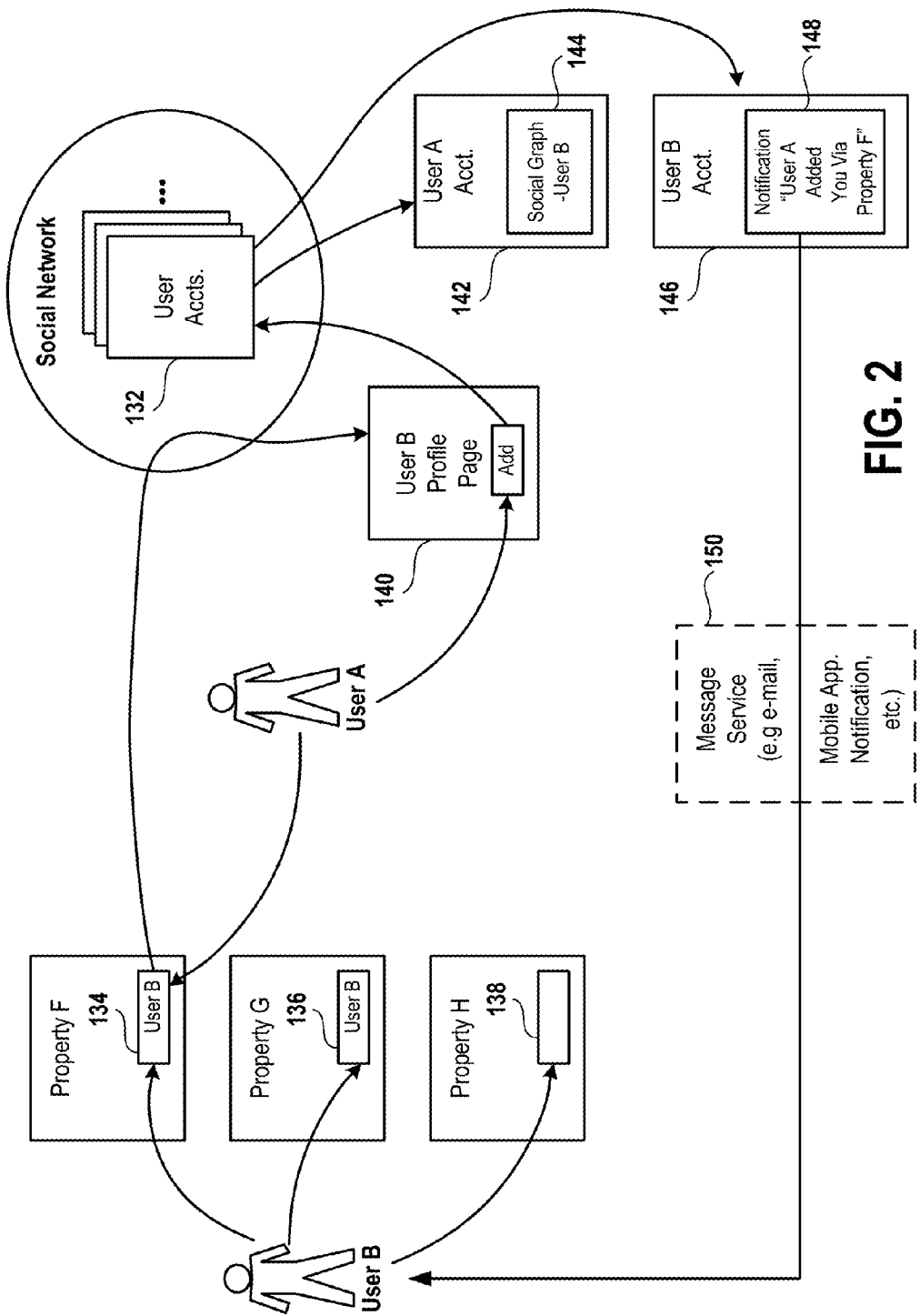
FIG. 2 broadly illustrates a process for providing context regarding an addition to a social graph, in accordance with implementations of the present disclosure.

FIG. 2 broadly illustrates a process for providing context regarding an addition to a social graph, in accordance with some implementations. A social network 130 is provided, including user accounts 132. Each user in the social network 130 has a social graph which defines that user's connections to other users. As shown, a user A and a user B both have accounts on the social network 130. Initially user A and user B are unrelated in that neither user is in the other's social graph. In the illustrated implementation, property F, property G, and property H are various network-accessible/connected properties which may be visited or accessed by users over a network. Examples of network-accessible properties include websites, applications, apps, or other types of objects which are made accessible over a network or which communicate over a network to retrieve or send data or are otherwise connected to or reliant upon a network, e.g., the Internet. By way of example, a property (e.g., a website) may have a parallel dedicated mobile app which enables users to access the same information through a mobile device (e.g., a smart phone or tablet computer) in a presentation format optimized for the mobile device. It should nonetheless be understood by those skilled in the art that the properties F, G, and H are to be broadly construed as items which facilitate user interaction that enables the social functionality described herein.

As shown, property F includes a social object 134, property G includes a social object 136, and property H includes a social object 138. A social object is an item integrated into a property which identifies a user having an account on the social network 130. A social object is generally defined by an activity of a social network user who interacts on the property, for example by commenting or posting data. Examples of a social object include a comment, review, picture, video, or other item posted by a social network user that identifies the social network user. In the illustrated implementation, user B has visited each of the properties F, G, and H, and interacted with each of the respective social objects 134, 136, and 138. Thus, social objects 134, 136, and 138 each identify the user B, who is a user with an account on the social network 130.

When user A visits one of the properties F, G, or H, user A may encounter the corresponding social object defined on that property that identifies user B, and so learn about user B's existence on the social network. Based on this discovery of user B, user A may proceed to add user B (or request to add user B) to user A's social graph. This will trigger a notification sent to user B via the social network 130 informing user B that he/she has been added to user A's social graph. However, if user B does not otherwise know of user A, then merely informing user B of the addition provides user B with no context as to how or why user A would add user B to their social graph.

Therefore, in accordance with implementations of the present disclosure, methods and systems as described herein provide for user B to be provided with context regarding user B's addition to user A's social graph. For simplicity of disclosure, implementations are generally described with reference to the provision of context regarding addition of user B to user A's social graph. However, similar concepts and principles as are described herein can be applied to provide context regarding a request to add user B to user A's social graph which may precede an actual addition of user B to user A's social graph.

In the illustrated implementation, user A visits property F, and views the social object 134 which identifies user B. Based on viewing user B's activity as evidenced by the social object 134 (e.g. reading a comment or review posted by user B), user A may become interested in user B and wish to add user B to user A's social graph. Thus, the user A may navigate from the property F to user B's profile page 140 on the social network. This may be accomplished through a link or reference provided in the social object 134 that enables user A to navigate to user B's profile page 140. From user B's profile page 130, user A may proceed to add user B to user A's social graph 144, the addition being stored to user A's social network account 142. In another implementation, the social object 134 may be configured to enable user A to add user B to user A's social graph 144 directly from the social object 134.

After user B has been added to user A's social graph 144, a notification 148 is generated and applied to user B's social networking account 146. The notification 148 indicates that user B was added user A's social graph, and also provides context regarding the addition. In the illustrated implementation, the context provided may include information identifying the property F on which user A viewed the social object 134. In one implementation, the context may further include identification of the specific social object 134 on the property F. For example, the notification 148 may indicate that user A added user B after viewing user B's comment/review or other posted item on the property F.

The generated notification 148 is associated with user B's social network account 146. In some implementations, the notification is sent to user B via a message service 150, e.g., an e-mail service, a mobile app notification service, etc. In this manner, user B is informed not only of the fact of the addition to user A's social graph, but also the context by which user A learned about user B's existence and from which user A effected the social graph addition.

Figure 3:
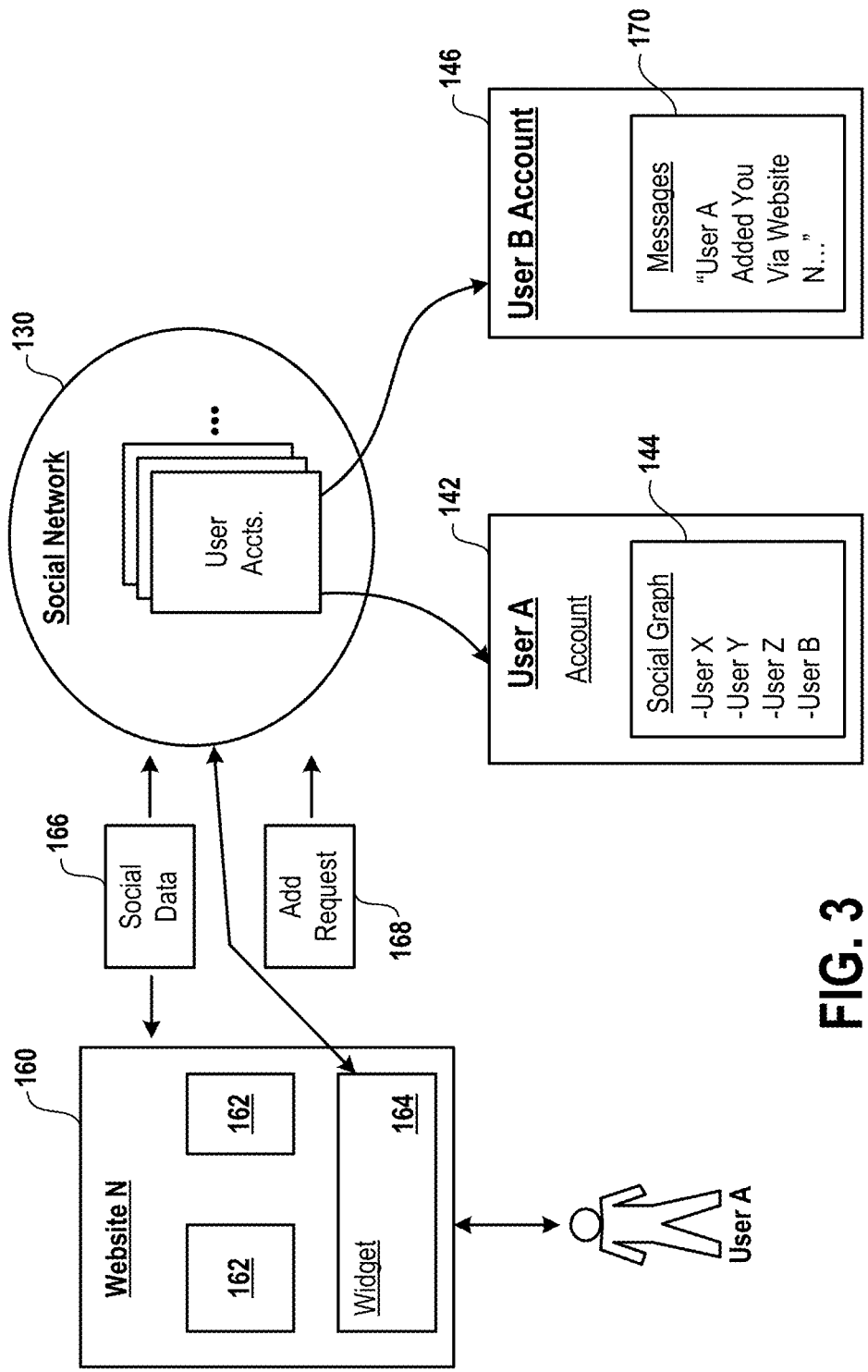
FIG. 3 illustrates a user making an addition to a social graph from a website, in accordance with implementations of the present disclosure.

FIG. 3 illustrates a user making an addition to a social graph from a website, in accordance with implementations of the present disclosure. As shown, the user A visits a website 160. The website 160 includes content 162, which can be any type of content communicable over the Internet or presentable via the website 160, including text, graphic content, video content, audio content, interactive application content, etc. Additionally, the website 160 includes a social widget 164 which enables a social functionality to be integrated in the website 160. The social widget 164 is a plugin or application for the website that is executed alongside the rendering of the website to the user A. The social widget 164 communicates with the social network 130 to retrieve and send social data 166.

By way of example, the social widget 164 may be a comments widget that enables social network users to generate comments relating to content presented on the website 160. The comments from social network users are displayed by the social widget as part of the website 160. Each comment may identify the social network user who generated that comment, and provide various options relating to that user or the user's comment, including a link to the user's social network profile page, an option to subscribe to the user or the specific comment, an option to indicate endorsement of the comment, an option to reply to the comment, and an option to add the user to the active visiting user's social graph (user A's social graph in the illustrated example). It will be appreciated that the comments widget can be configured to send comment data to the social network 130 for storage, and retrieve comment data from the social network 130 at the time of rendering of the website in order to present the comments associated with the content 162 to the visiting user.

In another example, the social widget 164 may be an endorsement widget that enables social network users to indicate endorsement of the content 162 on the website 160. The endorsement widget may enable the active user to see the names of other social network users who have endorsed the content 162 on the website 160. By way of example, each user name may be linked to the user's corresponding social network profile page, enabling the active user to navigate to the profile page of another user indicating endorsement to learn more information about the other user. The endorsement widget may also include an option to add a user to the active user's social graph directly from the website 160.

In various other implementations, it will be apparent that the social widget 164 may be configured to provide any type of functionality that may be associated with users of the social network 130. Broadly speaking, the functionality of the social widget 164 may permit a social network user to define an activity that is associated with their user account, and which may be displayed by the social widget 164 on the website 160, identifying the social network user to other users who visit the website.

With continued reference to FIG. 3, the data presented by the social widget 164 identifies user B to the user A. This is the result of user B's prior activity when visiting the website 160, performing an action via the social widget, e.g., generating a comment or indicating endorsement, so as to generate social data 166 that is stored by the social network 130. This social data 166 is later retrieved and presented by the social widget 164 when user A visits the website 160, thus indicating to user A the activity of user B. In the illustrated implementation, the user A generates a request 168 to add user B to his social graph via the social widget 164. The request is communicated to the social network 130, which proceeds to process the request. The user B is added to user A's social graph 142, and a message informing user B of the addition and providing the context of the addition, is associated with user B's account 146 as part of user B's messages 170. The context can include identification of the website from which user A generated the request to add user B, as well as information about user B's activity on the website via the social widget which enabled user A to learn about user B's existence.

Figure 4:
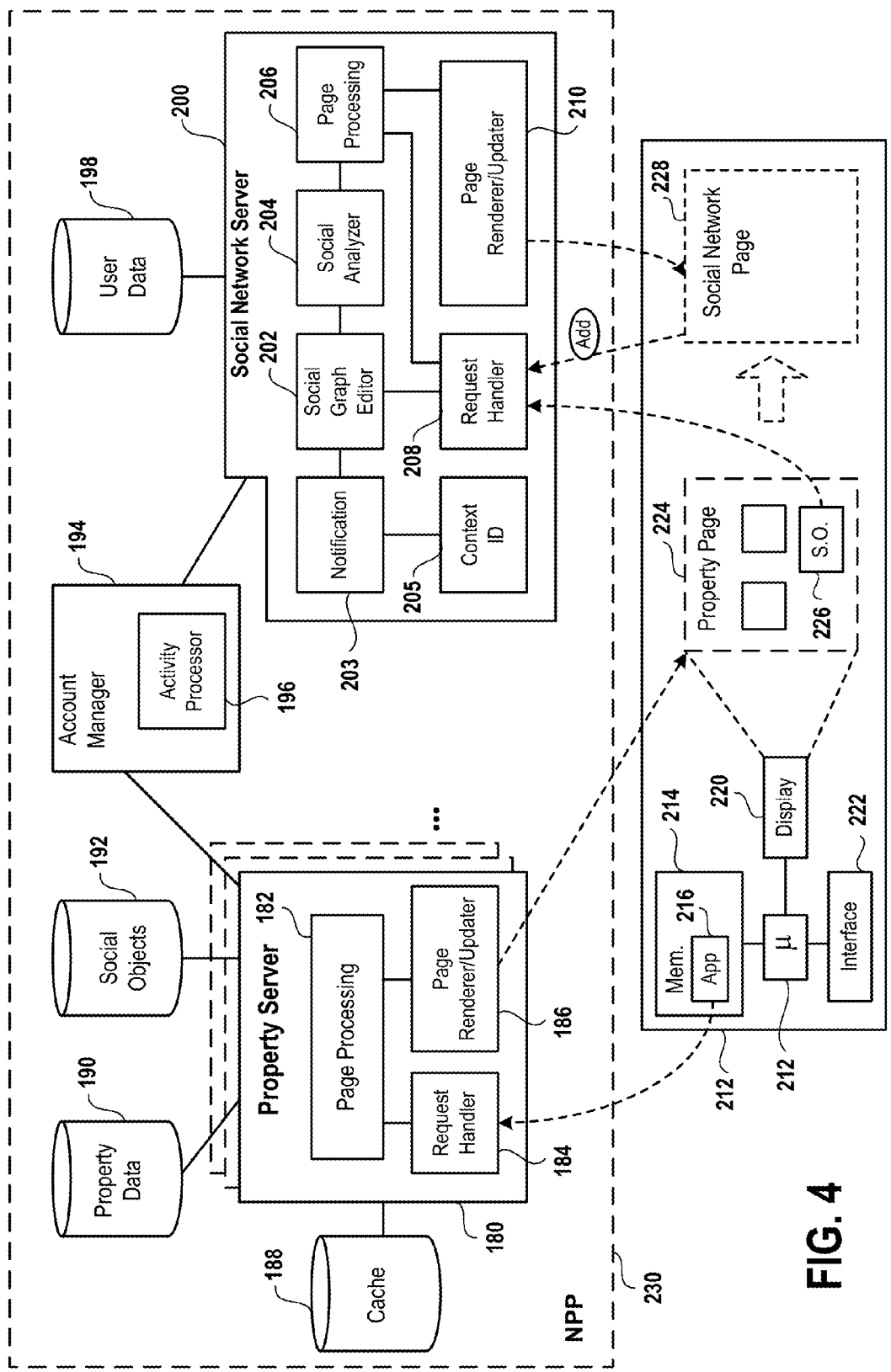
FIG. 4 illustrates systems for facilitating a social graph addition via a property separate from a social network, in accordance with implementations of the present disclosure.

FIG. 4 illustrates systems for facilitating a social graph addition via a property separate from a social network, in accordance with implementations of the disclosure. A user operates a device 212, which may be any device which may be configured to access a property and a social network. The device 212 should be broadly construed to include various kinds of mobile and non-mobile devices, and may include multiple subsidiary devices. By way of example and not limitation, the device 212 can be a personal computer system, a laptop computer, a tablet computer, a smartphone, etc. The device 212 includes memory 214 for storing processor-executable instructions, and may include both volatile and nonvolatile memory types. The device 212 further includes a processor 218 for executing said instructions, and a display 220 for displaying pages of the property or social network to the user. It will be understood that pages of the property or social network are to be broadly construed to include any type of representative display of the property or social network. Thus, by way of example, a page can be a webpage, a view provided by an application, or any other type of visual representation of a property or social network. An interface 222 may include any of various interface mechanisms, e.g., a keyboard, mouse, touchpad, touchscreen, joystick, accelerometer, or any other type of mechanism by which a user may provide input to the device 212. In the illustrated implementation, an application 216 executes from memory 214. In some implementations, the application 216 is a web browser. However, in other implementations, the application 216 can be any other type of application useful for accessing the property or the social network.

With continued reference to FIG. 4, a property server 182 is provided for performing processing and delivering data related to a specific property, to enable users to access and interact with the property. In one implementation, the property server 182 is a web page server. In other implementations, the property server 182 can be any other type of server suitable for communicating with the device 212 to enable the user to access the property. As shown, the property server 180 includes a request handler 184 for receiving and parsing requests from the application 216. A page processing module 182 performs processing in order to service a particular request, e.g., a request for a property page or a request for an update to a property page. In one implementation, the page processing module 182 retrieves data from a property data storage 190, which contains content data that defines content displayed on the property page. The page processing module 182 may also retrieve social object data from a social object storage 192. The social object provides functionality on the property page that is tied to the social network, as described elsewhere herein. The page processing module 182 may also both store data to and retrieve data from a cache 188. By way of example, data relating to a frequently recurring request may be stored in the cache 188 to enable faster retrieval upon the next receipt of that request. A page renderer/updater 186 sends data to the device 212 to render or update a property page 224 on the display 220 of the device 212.

Though a single property server 180 has been described above, it will be appreciated by those skilled in the art that there may be any number of property servers configured to provide users with access to various properties. In some implementations, multiple properties may be owned or operated by a single network property provider 230. In such a configuration, the activities of users can be readily determined across the various properties of the network property provider 230. Furthermore, the network property provider 230 may also provide a social network, which may facilitate integration of services amongst various properties in combination with the social network.

In the illustrated implementation, an account manager 194 manages accounts of users accessing any of the properties or the social network associated with the network property provider 230. The account manager 194 may handle such activities as authenticating users on the network property provider 230, managing user preferences, or any other type of activity related to management of the users accounts. The account manager 194 may also include an activity processor 196 that is configured to determine the activity of users across the various properties as well as the social network of the network property provider 230.

The social network server 200 manages and provides for user access to the social network of the network property provider 230. As shown, the social network server 200 includes a request handler 208 which receives and parses incoming requests to access the social network. In one implementation, the request handler 208 defines an API of the social network, enabling various entities to communicate with the social network. A social graph editor 202 performs edits to a social graph of a given user, which may include various functions, e.g., adding and deleting users from the social graph, or organizing particular users within a given social graph into one or more groups. The social network server 200 stores and retrieves user data from a social network user data storage 198. Such user data can include various types of information, including data defining a user social graph, descriptive information, multimedia objects including photos, videos, and music, user entries and posts, and any other type of information associated with particular users and their activity on the social network.

A page processing module 206 processes data to define a social network page in response to a request. A social analyzer 204 performs analysis of a user's social graph to provide social context information that is based on the given user's social graph. For example, when a first user visits a second user's social network profile page, the social analyzer 204 may analyze the social graphs of both the first user and the second user to determine users which are common to both of the first user and the second user. As another example, the social analyzer 204 may also analyze the social graphs of both the first and second users to determine users which the first user may be interested in adding to his or her social graph. This can be based on analysis of users that are related to users in the social graphs of both the first and second users but which have not been added to the first user's social graph. In various other implementations, it will be appreciated that the social analyzer 204 can be configured to perform any type of analysis of the social graphs of users within the social network. A page renderer/updater 210 sends page rendering or page update data to the device 212 to enable rendering of a social network page 228 on the display 220 of the device 212.

With continued reference to FIG. 4, the property page 224 is rendered on the display 220 of the device 212. The property page 224 includes social object 226. It will be appreciated by those skilled in the art that the social object 226 can be provided as part of the property page 224 by the property server 180. However, in other implementations, the social object 226 can be referenced from the property page 224 and actually provided by the social network server 200. The social object 226 can be configured to retrieve data or receive updates from the social network server 200.

In the illustrated implementation, the user is logged in to the network property provider 230 via the account manager 194. As the user engages with the property page 224, his activity is determined by the activity processor 196. The social object 226 presents content which has previously been defined by an activity of a second user on the property. Thus, from the social object 226, the user may learn of the secondary user's existence on the social network. In some implementations, the user can navigate from the property page 224 to a social network profile page of the secondary user, which in the illustrated implementation can be the social network page 228. This navigation may be accomplished via a link provided as part of the social object (e.g. a link associated with the user name of the secondary user) or another type of request/reference to the social network server 200.

From the social network profile page of the secondary user, the primary user may choose to add the secondary user to his social graph. The activity of the primary user from the property page to the social network page is determined by the activity processor 196. When the primary user adds the secondary user to his social graph, a notification module 203 is triggered to generate a message to the secondary user informing the secondary user that he has been added to the primary user's social graph. A context identification module 205 can determine, based on the determined activity of the primary user, that the primary user learned of the secondary user's existence on the social network from the specific property page 224 which was previously visited by the primary user and which included content defined by the secondary user. This information can be utilized to provide context to the secondary user regarding the primary user's addition of the secondary user to the primary user's social graph, as part of the message generated by the notification module 203.

Figure 5:
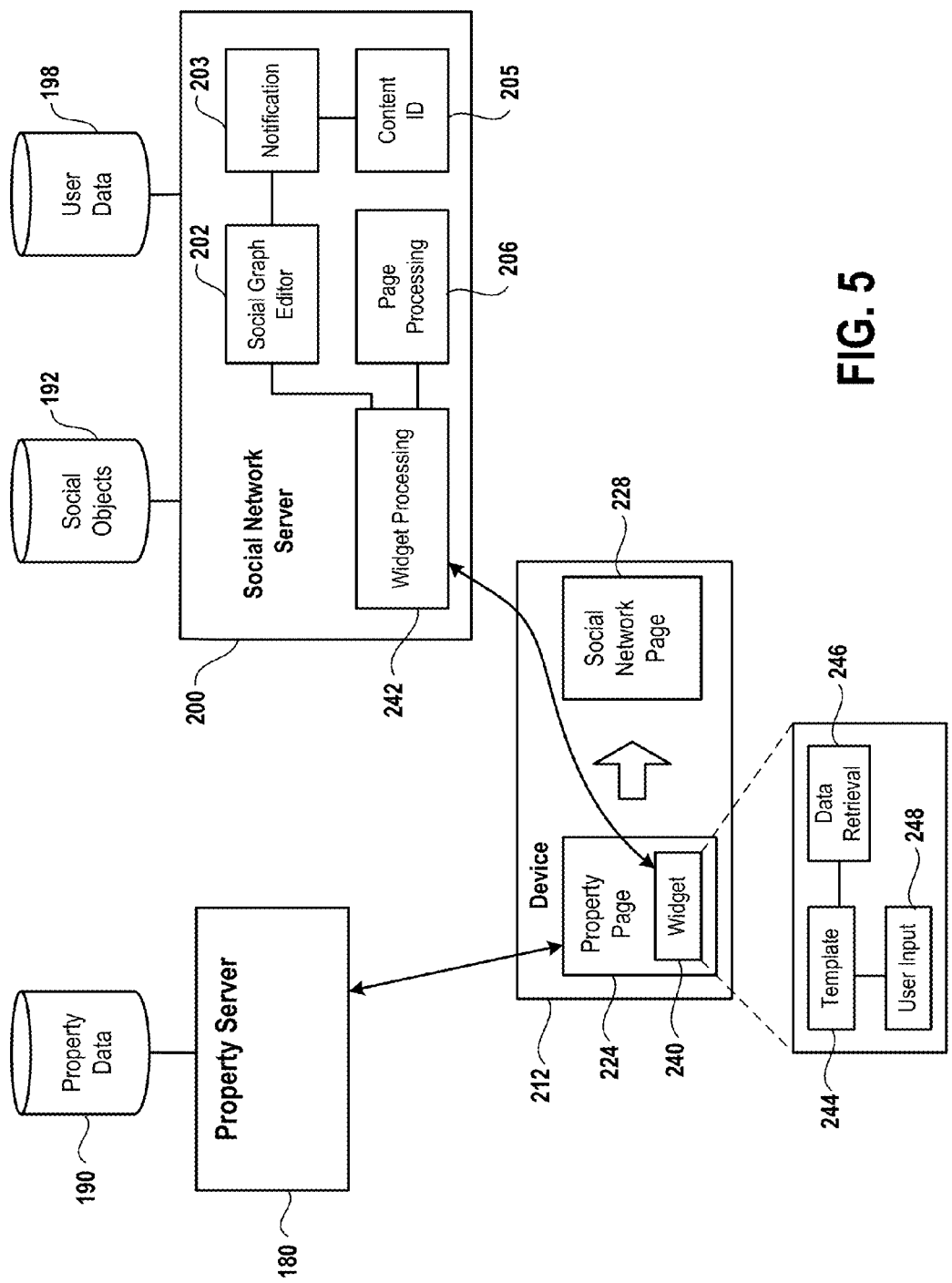
FIG. 5 illustrates systems for providing social objects related to a property page, in accordance with implementations of the present disclosure.

FIG. 5 illustrates systems for providing social objects related to a property page, in accordance with implementations of the disclosure. The user accesses a specific property via the device 212. The device 212 communicates with the property server 180, which receives requests from the device 212 and sends data to the device 212 to define a property page 224 rendered on the device. In some implementations, a widget 240 is defined as part of the property page 224. The widget 240 can be an object or application that is embedded or otherwise integrated into the property page 224. The widget 240 provides for a socially integrated functionality related to a social network that identifies other users on the social network in the context of the property page.

By way of example, the widget 240 may provide for the rendering of social objects, as have previously been discussed, as part of the property page 224. In other implementations, the widget 240 may provide for other types of social functionality which are integrated into the property page and which identify other users on the social network. In some implementations, the widget 240 is provided by the property server 180 as part of the property page data. However, in other implementations, the property server 180 provides data defining the property page 224 that includes a reference or request to the social network server 200 to retrieve the widget 240 from the social network server 200.

In the illustrated implementation, the widget 240 communicates with the social network server 200 to provide the socially integrated functionality. To this end, the social network server includes a widget processing module that processes requests from the widget 240. The widget 240 may define a template 244 which provides a construct according to which social object data may be presented. A data retrieval module 246 retrieves social object data relevant for the property page 224 from the social network server 200 to populate the template 244. To facilitate retrieval of relevant social object data for the property page 224, the data retrieval module 246 may generate a request to the widget processing module 242 of the social network server which identifies the property page 224. Additionally, the request may identify the user that is accessing the property page 224. The relevant social object data can be retrieved by the social network server 200 from a social objects data storage 192, and may be specifically associated with the property page 224, and furthermore, may be specifically tailored to the active user operating the device 212.

For example, the social object data may define or highlight users who are in the social graph of the active user, or may highlight users who are closely related to the active user (e.g. fewer degrees of separation from the user in the social network). The widget 240 may also define a user input module 248 which processes input from the active user to define another instance of a social object (e.g. a new comment, review, indication of endorsement, multimedia upload, etc.). Such user input would be communicated to the social network server 200 and would become part of the social object data associated with the property page 224.

As discussed, the widget 240 can provide for presentation of a social object or a social functionality integrated with the property page 224. The social object or social functionality identifies to the active user a secondary user of the social network. The social object or social functionality may also provide a link or reference to a social network page 228, thereby facilitating navigation by the active user from the property page 224 to the social network page 228. In some implementations, the social network page 228 may be the profile page of the secondary user identified on the property page 224. In other implementations, the social network page 228 may be a page providing an interface to the active user's social network account. By way of example, this may be to confirm or otherwise enable the active user to add the second user to his/her social graph.

When the active user initiates an event to request or cause addition of the secondary user to his or her social graph, the social graph editor 202 processes the request. The initiating event can be via the widget 240, or via a link on the social network page 228, by way of example. In response to the request to add the secondary user, the social graph editor 202 may execute the addition directly, or may request permission first from the secondary user. In either scenario, the request triggers the notification module 203 to generate a message to the secondary user regarding the request/addition. The context identification module 205 identifies the context of the request/addition, and this information is incorporated into the message to the secondary user, thereby providing the secondary user with context for the request/addition.

Figure 6:
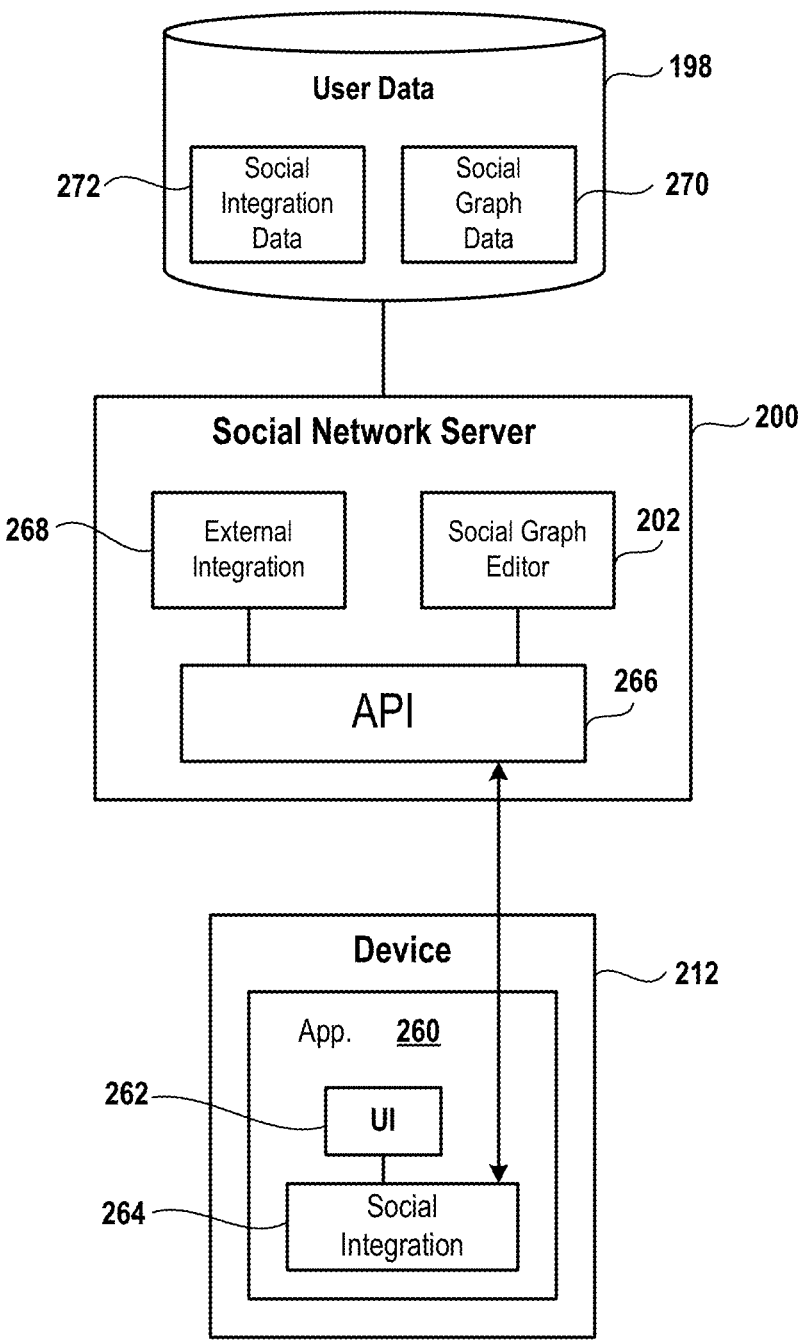
FIG. 6 illustrates systems for enabling an application to integrate social networking functionality, in accordance with implementations of the present disclosure.

FIG. 6 illustrates systems for enabling an application to integrate social networking functionality, in accordance with implementations of the disclosure. As shown, an application 260 executes on the device 212. The device 212 can be a mobile device (e.g. smartphone, tablet, etc.), non-mobile device (e.g. desktop personal computer), or any other type of device configured to execute the application 260. The application 260 includes a user interface (UI) 262 for enabling a user to interact with the application. The application 260 also includes a social integration module 264 which provides for the integration of a social network related functionality within the context of the application 260. Merely by way of example, the functionality can provide for such features as comments, reviews, indications of endorsement, messaging, linking, posting to the social network, etc. The social integration module 264 communicates with an API 266 of the social network server 200. The social network server 200 includes an external integration module 268 which handles requests from the social integration module 264. In the illustrated implementation, the user data storage 198 includes social integration data 272, which includes stored data that has been previously defined by the activity of users of the social network via the functionality provided for by the social integration module 264. For example, such stored data can include comment data, review data, endorsement data, messaging data, and other types of data relating to the functionality of the social integration module 264.

The social integration module 264 may additionally identify users of the social network in conjunction with presentation of data defined by their activity through the social integration module 264, or a parallel instance of the module. As such, a user of the device 212 may learn of the existence of other users on the social network via the social integration module 264. In some implementations, the social integration module 264 can facilitate adding a secondary user to the primary user's social graph by accessing a social graph editor 202 of the social network server 200. The social graph editor 202, modifies the social graph data 270 associated with the primary user to add the secondary user to the primary user's social graph.

Figure 7:
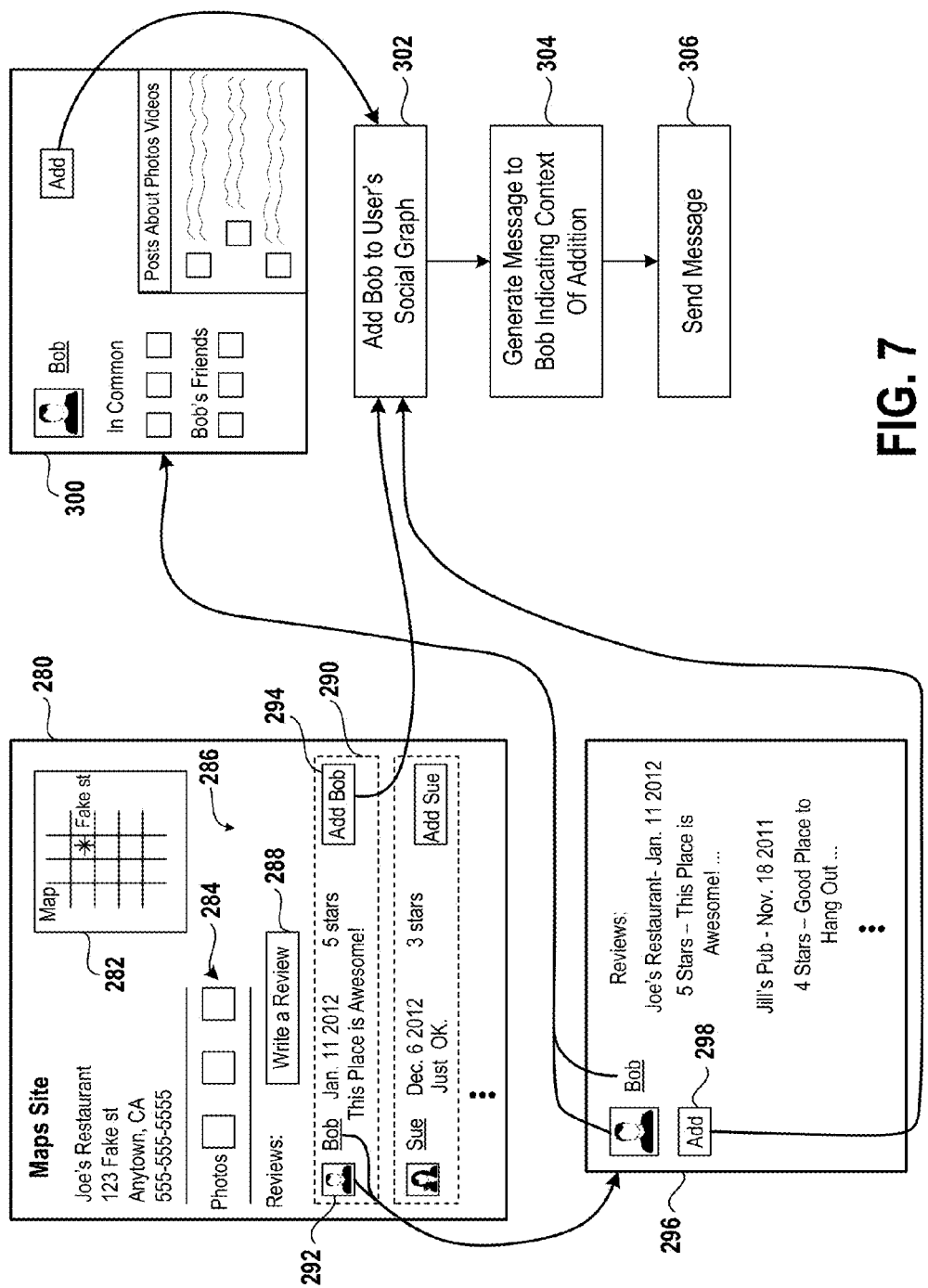
FIG. 7 illustrates various pages from which a primary user may discover and add a secondary user to the primary user's social graph, in accordance with an implementation of the present disclosure.

FIG. 7 illustrates various pages from which a primary user may discover and add a secondary user to the primary user's social graph, in accordance with an implementation of the disclosure. By way of example, a page 280 can be a webpage of a maps website. The webpage 280 can include various elements, including a map 282, information identifying a location or entity, e.g., a restaurant or business, photos 284, etc. In the illustrated implementation, a reviews section 286 is displayed on the page 280. The section 286 includes a button 288 which a user may click on to post a review to the reviews section 286. Additionally, reviews left by various other users are displayed on the page. By way of example, a review 290 can include various types of information including the date of the review, a rating, comments by the secondary user who posted the review, as well as identification information, e.g., the secondary user's username (e.g. "Bob" in the illustrated figure), and a profile picture 292 of the secondary user. By viewing the review 290, the primary user visiting the page 280 learns of the existence of the secondary user who posted the review 290. In one implementation, a button 294 is provided whereby the primary user may add the secondary user to his or her social graph.

In some implementations, clicking on the username or profile picture of the secondary user may navigate the primary user to a second page 296 which displays or otherwise provides access to various reviews which have been posted by the secondary user. On the page 296, a button 298 may be provided to enable the primary user to add the secondary user to his/her social graph. In some implementations, the primary user may navigate from the page 296 to a social network profile page 300 of the secondary user. This may be facilitated by selection of the username or profile picture of the secondary user on the page 296. The profile page 300 of the secondary user may have various elements, e.g., information identifying users which the primary user and secondary user have in common on their respective social graphs, identification of users in the secondary user's social graph, posts by the secondary user, information about the secondary user, uploaded photos or videos, etc. The profile page 300 can also include an add button 300 to enable the primary user to add the secondary user to his/her social graph.

Based on the above-described mechanisms, at operation 302, the secondary user is added to the primary user's social graph. At operation 304 a message to the secondary user indicating the context of the addition is generated. At operation 306, the message is sent to the secondary user.

Figure 8:
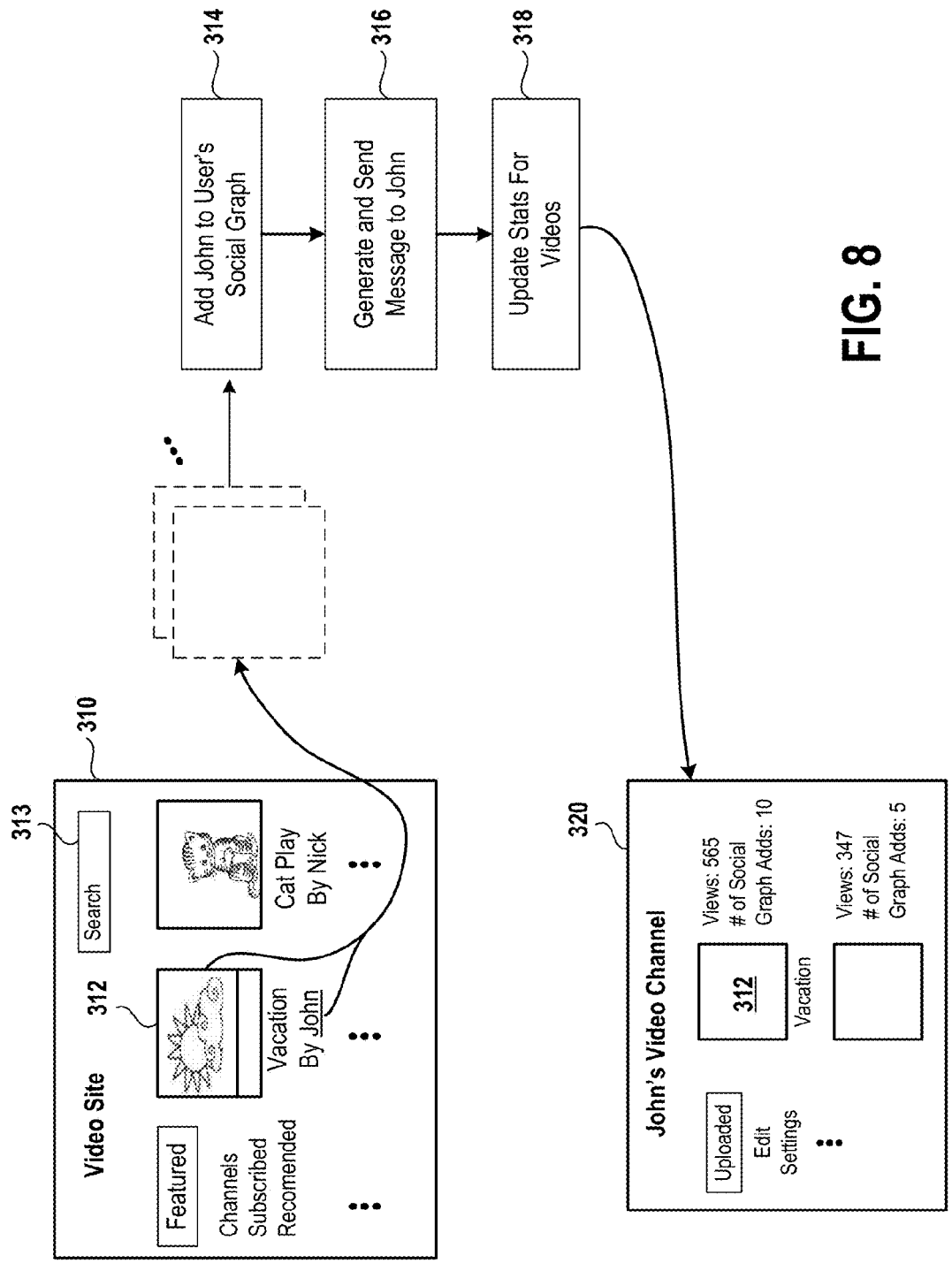
FIG. 8 illustrates a social graph addition occurring via a video website, in accordance with implementations of the present disclosure.

FIG. 8 illustrates a social graph addition occurring via a video website, in accordance with implementations of the disclosure. A webpage 310 of the video website is displayed to the active user upon navigation to the video website. In some implementations, the video website can display various categories of videos to enable the user to access videos in a more systematic way. By way of example, there may be a menu providing access to "Featured" videos, "Channels" of videos from specific high-visibility entities or users, "Subscribed" videos from specific users to whom the active user has subscribed, and "Recommended" videos which are selected for the active user based on his or her browsing history or other known factors which are specific to the active user. In some implementations, the video website can provide a search tool 313 to enable users to search by keyword for videos available through the video website.

In the illustrated implementation, the active user accesses a video 312 that has been posted by a user "John." By accessing the video 312, the active user may become interested in adding user John to his/her social graph. Therefore, in accordance with various implementations, it is possible for the active user to add the user John to his/her social graph in an operation 314 through various possible navigational paths, all of which originated from the video website. For example, the active user may add the user John directly from his/her personal page on the video website, after navigating to the user John's page or channel on the video website, or after navigating away from the video website to a page on the social network website, e.g., the user John's profile page on the social network. The activity of the active user can be determined to enable determination of the context of the social graph addition, and consequent generation and sending of a message of a message to the user John which informs him of the addition and provides its context. By way of example, the context may be that the active user added the user John to his/her social graph via the video website, or more specifically after viewing the video 312 posted by the user John.

In some implementations, a user of the video website may be able to view the number of social graph additions which have occurred via specific videos posted by the user. In the illustrated implementation, at operation 318, statistics for the video 312 are updated to reflect the social graph addition performed by the active user. In one implementation, when the user John visits a management page view for his video website channel, he is able to see the number of social graph additions which have resulted from the viewing of specific videos, including video 312. Based on this knowledge, the user John may tailor the content of the videos posted so as to increase the number of social graph additions.

Though the foregoing implementation has been described with reference to video content on a video website, it will be appreciated that similar principles and concepts for providing context of a social graph addition may be provided in relation to any other type of content, e.g., audio content, graphic content, written content, etc., which may be provided by way of a website or other vehicle, e.g., an application. Merely by way of example, an active user may choose to add a secondary user to his/her social graph after accessing content posted by the secondary user. The context of the addition can be provided to the secondary user. The provided context may identify the location of the content (e.g. the website on which the content was posted) and may further identify the specific content which was accessed that resulted in the social graph addition.

Figure 9:
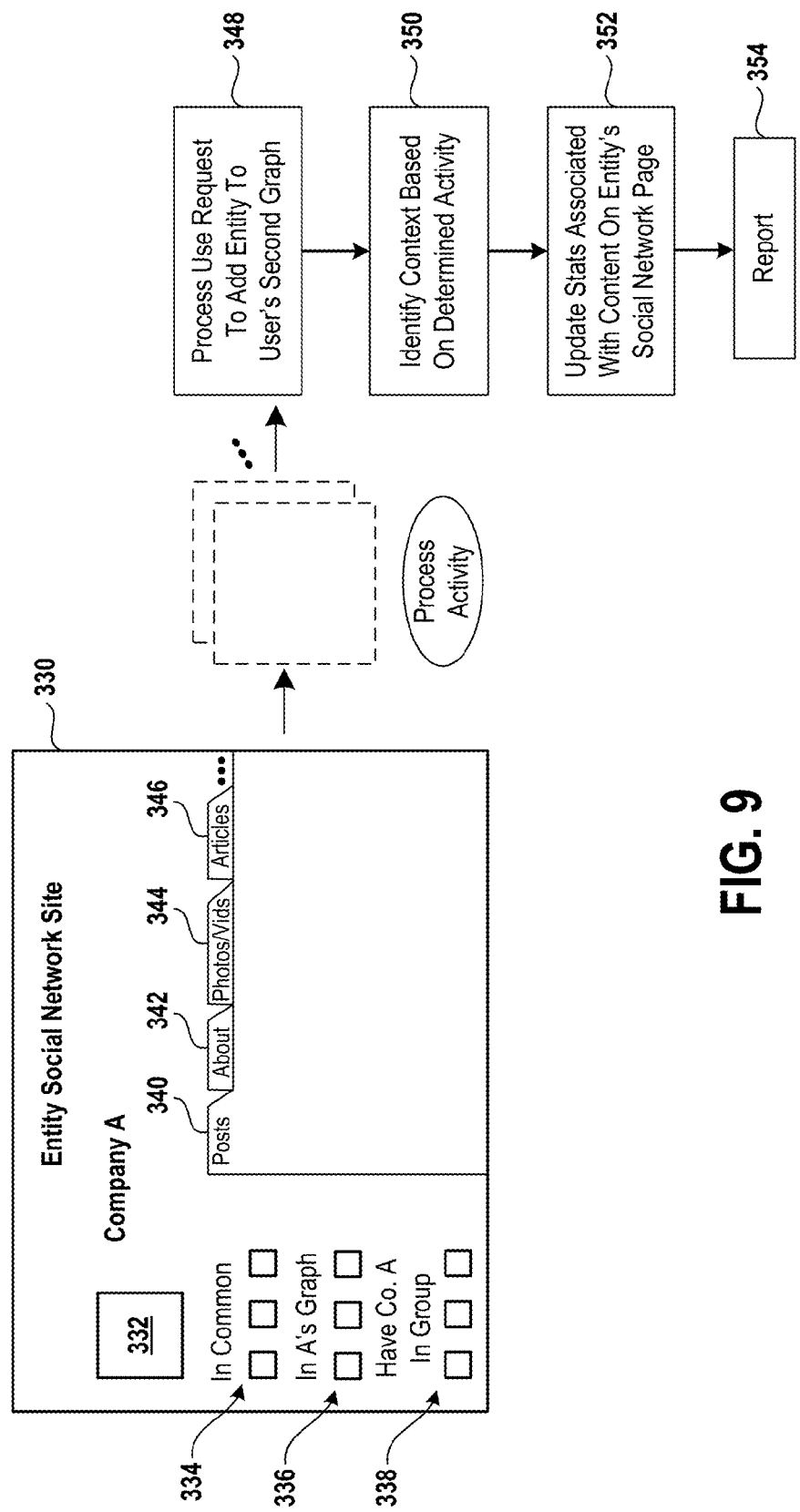
FIG. 9 illustrates a social graph addition from a social networking page of an entity, in accordance with implementations of the present disclosure.

FIG. 9 illustrates a social graph addition from a social networking page of an entity, in accordance with implementations of the disclosure. A profile page 330 of an entity in the social network is shown. An entity will generally be understood as a non-personal user in the social network. Examples of entities may include businesses, public figures, celebrities, organizations, brands, and other types of users represented in the social network in a non-personal capacity. An entity's profile page 330 as seen by an active user can have various features, including a profile picture 332, identification of users in the entity's social graph which are also in the active user's social graph (reference 334), identification of users in the entity's social graph (reference 336), identification of users that have added the entity to their social graph (reference 338). The profile page 330 of the entity can also include various tabs for providing access to various kinds of information, including a posts tab 340 which provides access to posts made by the entity; an about tab 342 which provides descriptive information about the entity, a photos/videos tab 344 which provides access to photos and videos or other multimedia content posted by the entity, an articles tab 396 which provides access to articles posted by the entity, etc.

When the active user visits the profile page 330 of the entity, her activity on the entity's social network profile page can be determined, e.g. determining specific content that is accessed by the active user. After viewing content of the entity's social network page 330, the active user may choose to add the entity to her social graph. Thus, the user will request to add the entity to her social graph, generating a request that is processed at operation 398. At operation 350, the context of the social graph addition is identified based on the determined activity of the active user while visiting the entity's profile page. At operation 352, statistics associated with content on the entity's profile page are updated to reflect the social graph addition made by the active user. At operation 354, the statistics are reported to the entity in an appropriate manner. By way of example, the entity may be added by many users and therefore it is impractical or undesirable to report each individual social graph addition and its context to the entity. In such a scenario, the number of social graph additions over a specified time period for a particular context can be reported. Also, such reporting can detail specific numbers of social graph additions correlated to specific pieces of content accessed by users prior to generating requests to add the entity to their social graphs.

Figure 10:
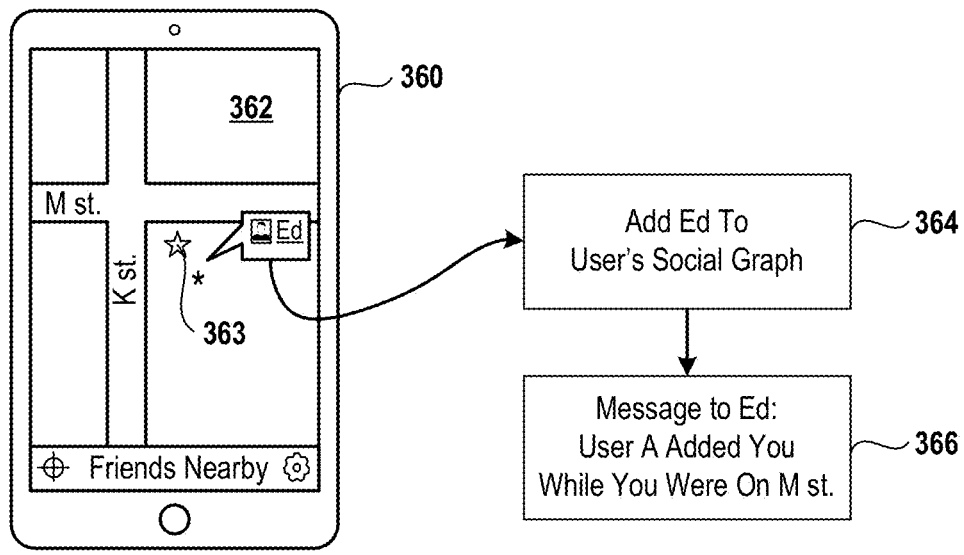
FIG. 10 illustrates an example of providing context for a social graph addition, in accordance with an implementation of the present disclosure.

FIG. 10 illustrates an example of providing context for a social graph addition, in accordance with an implementation of the disclosure. A mobile device 360 is shown executing an app having an interface 362. The app provides for identification of other users of the app (or service corresponding to the app) who are located nearby to the primary user operating the device 360. In the illustrated implementation, the app interface 362 indicates the primary user's current position 363 on a map, and identifies a user "Ed" located nearby. At operation 364, the primary user may add Ed to his social graph, either directly from the current app, or perhaps via additional properties or pages. At operation 366, a message is generated to Ed, notifying Ed of the social graph addition and providing the context of the addition. In the present example, the message identifies that Ed was added to the primary user's social graph while he was at a particular location.

Figure 11:
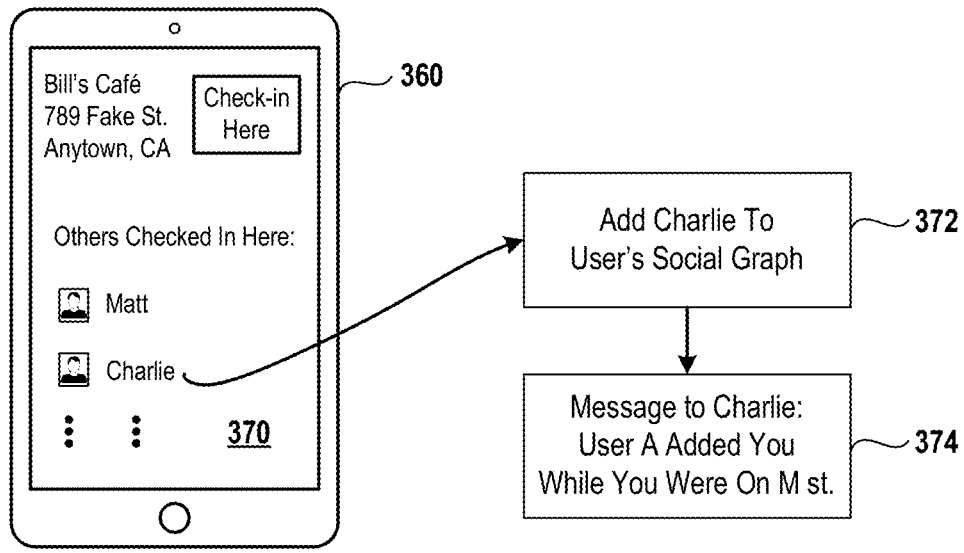
FIG. 11 illustrates an example of providing context for a social graph addition, in accordance with an implementation of the present disclosure.

FIG. 11 illustrates an example of providing context for a social graph addition, in accordance with an implementation of the disclosure. The mobile device 360 is shown executing an app which enables a user to check in to an establishment, e.g. a restaurant or other business. The app interface 370 is displayed on the mobile device 360, and may identify other users who have checked in to the same establishment, e.g. a user "Charlie" in the illustrated implementation. At operation 372, the active user may add the user Charlie to his or her social graph, either directly from the app or via other properties or pages. At operation 374, a message is generated and sent to Charlie, informing Charlie of the social graph addition by the active user and identifying that the addition occurred based on Charlie having checked in at the same establishment as the active user.

In another implementation, a first user may discover a second user when browsing a page of a third user that identifies the second user (e.g., a social network page of the third user that displays or otherwise features members of the third user's social graph including the second user). If the first user adds the second user after viewing the page of the third user, a notification informing the second user of his/her addition to the first user's social graph may identify the context of the addition, referencing the page of the third user or the third user's social graph and the second user's inclusion therein.

The specific examples regarding the provision of the context of a social graph addition have been provided herein by way of example only and not by way of limitation. In various other implementations, the context of a social graph addition can include or involve any of various types of properties or activities related to one or both of a first user and a second user who adds the first user to their social graph.

It will be appreciated that in various implementations, the specific level of granularity with which the context of a given social graph addition is provided can vary. For example, in various implementations, the context may be determined to be a given website or property, or a specific page that is part of the website or property, or a specific piece of content within a particular page. In some implementations, the specific context can be determined based in part on the primary user's interactions with a page or with specific content presented on the page. In this manner, the context can be determined with greater specificity based on user interaction so as to provide additional contextual detail to the secondary user regarding their addition to the primary user's social graph. The various implementations described herein are provided by way of example only, and not by way of limitation.

In some implementations, the primary user may be presented with options regarding the sending of messages identifying context of the social graph addition to the secondary user. Such options may be set before, during or after the social graph addition occurs. For example, in some implementations, an option may be provided to the primary user to determine whether or not to send contextual information as part of the notification sent to the secondary user following addition of the secondary user to the primary user's social graph. In this manner, the primary user may opt out of sending context information to the secondary user if they so choose. In some implementations, various options for providing specific types of information may be provided, e.g., whether to include website or property information, specific content identification, or other kinds of information in the notification. In some implementations, at the time of the social graph addition, the primary user may be presented with options for selecting which of a plurality of contextual information types to be included in the notification sent to the secondary user. Such options may be especially useful in the situation where there are several possible contextual reasons for the primary user's interest in the secondary user, e.g., when there are multiple pieces of content on a given page or property. In some implementations, there may also be presented an option to include a personal note.

Figure 12:
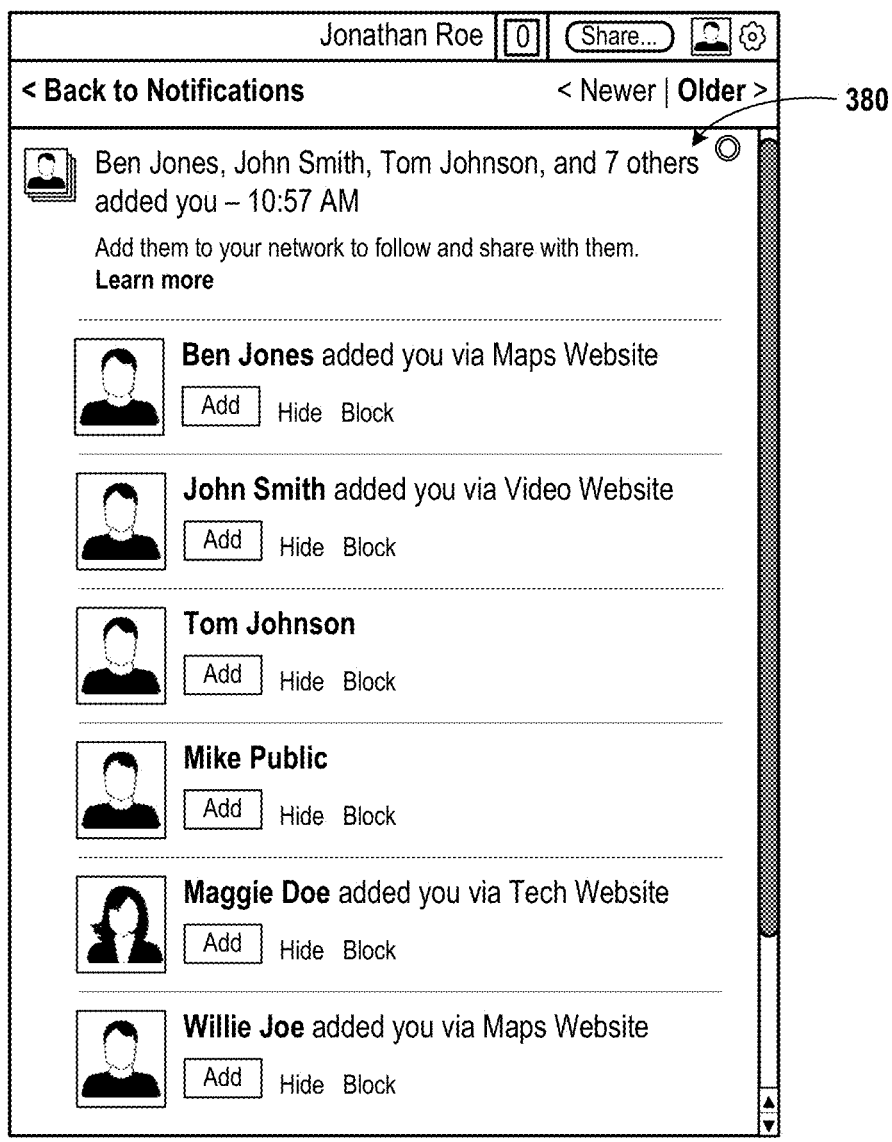
FIG. 12 illustrates a view of a primary user's notifications on a social network, in accordance with implementations of the present disclosure.

FIG. 12 illustrates a view of a primary user's notifications on a social network, in accordance with implementations of the disclosure. A general message 380 indicates that several users on the social network have added the primary user to their social graphs. The specific users who have added the primary user to their social graphs are detailed below the general message 380. For certain users, the context of the social graph addition is provided. For example, the user Ben Jones is indicated as having added the primary user via a maps website. The user John Smith is indicated as having added the primary user via a video website. And the user Maggie Doe is indicated as having added the primary user via a tech website. Some users may not have a context indicated for their addition of the primary user to their social graphs.

Figure 13:
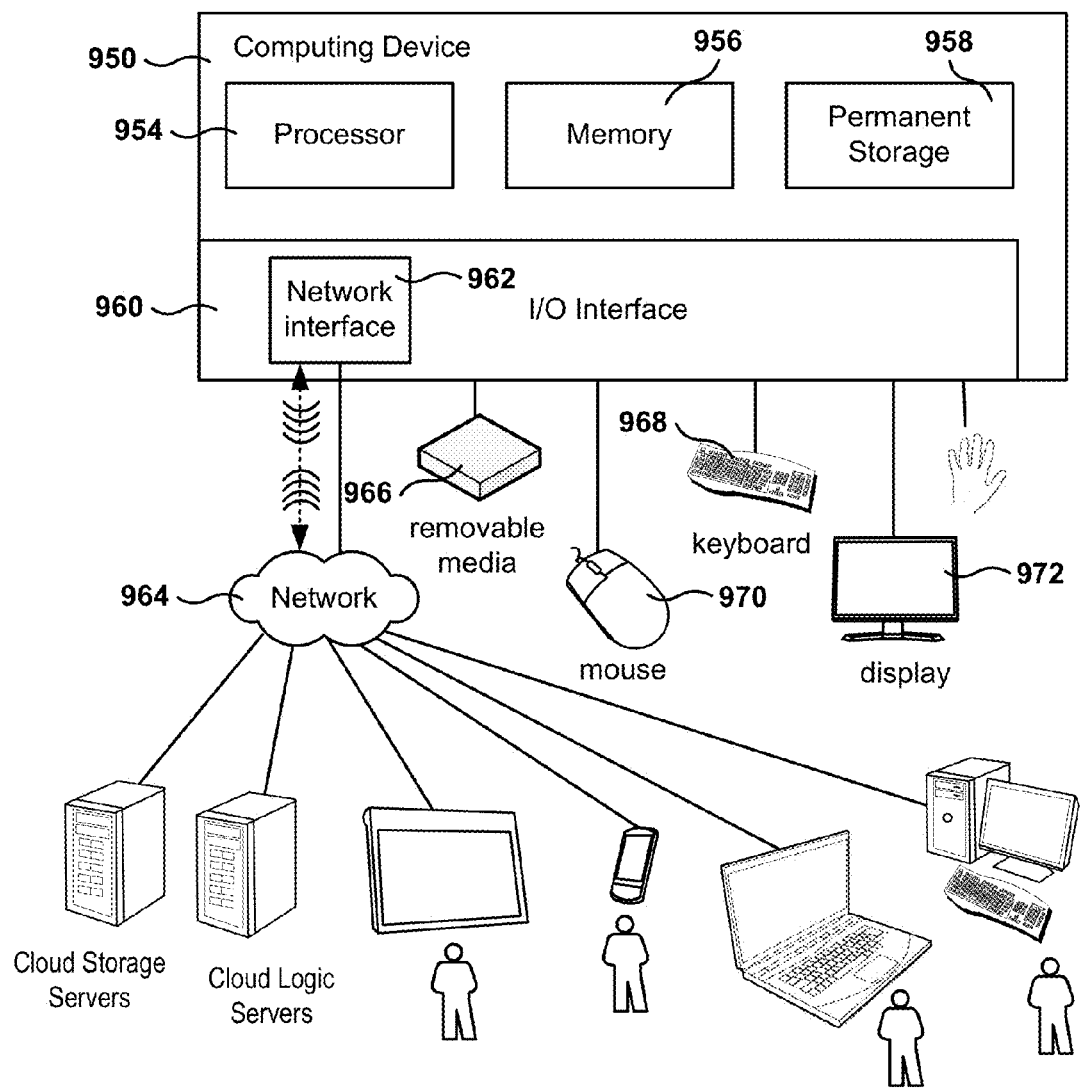
FIG. 13 is a simplified schematic diagram of a computer system for implementing implementations of the present disclosure.

FIG. 13 is a simplified schematic diagram of a computer system for implementing implementations of the present disclosure. It should be appreciated that the methods described herein may be performed with a digital processing system, which in one implementation may be a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device, e.g., a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Implementations of the disclosure can also be practiced in distributed computing environments where tasks are performed by remote processing devices that are linked through a wired or a wireless network.

Implementations of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 964. Network 964 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
   receiving, by a processor, a request from a first user to add a second user to a social graph of the first user;
   identifying, by the processor, a context in which the first user initiates the request to add the second user to the social graph of the first user, the context including an activity of the second user preceding the request to add the second user to the social graph of the first user;
   generating, by the processor, a message to be transmitted to the second user, the message including the request and information indicating the context in which the first user initiates the request; and
   initiating, by the processor, transmission of the message to the second user.

2. The method of claim 1, wherein the context includes a location of the second user when the first user initiates the request to add the second user to the social graph of the first user.

3. The method of claim 1,
   wherein the context defines an activity of the second user on a network-accessible property; and
   wherein the message identifies the network-accessible property or the activity of the second user on the network-accessible property.

4. The method of claim 3, wherein the network-accessible property is an Internet website.

5. The method of claim 3, further comprising determining activity of the first user from the network-accessible property to an event initiating the request to add the second user, the determined activity enabling the determination of the context.

6. The method of claim 1, wherein generating the message includes associating the message with a social networking account of the second user.

7. The method of claim 1, wherein the context defines one or more of a comment posted by the second user, or a review posted by the second user.

8. The method of claim 1, wherein the context is defined by an activity of the first user preceding the request to add the second user to the social graph of the first user.

9. A non-transitory computer-readable medium having program instructions embodied thereon that when executed, cause a processor to perform operations comprising:
receiving a request from a first user to add a second user to a social graph of the first user;
identifying a context in which the first user initiates the request to add the second user to the social graph of the first user;
generating a message to be transmitted to the second user, the message including the request and information indicating the context in which the first user initiates the request; and
initiating transmission of the message to the second user.

10. The non-transitory computer-readable medium of claim 9, wherein the context includes a location of the second user when the first user initiates the request to add the second user to the social graph of the first user.

11. The non-transitory computer-readable medium of claim 9,
wherein the context defines an activity of the second user on a network-accessible property; and
wherein the message identifies the network-accessible property or the activity of the second user on the network-accessible property.

12. The non-transitory computer-readable medium of claim 11, wherein the network-accessible property is an Internet website.

13. The non-transitory computer-readable medium of claim 11, further comprising program instructions for determining activity of the first user from the network-accessible property to an event initiating the request to add the second user, the determined activity enabling the determination of the context.

14. The non-transitory computer-readable medium of claim 9, wherein generating the message includes associating the message with a social networking account of the second user.

15. The non-transitory computer-readable medium of claim 9, wherein the context defines one or more of a comment posted by the second user, or a review posted by the second user.

16. The non-transitory computer-readable medium of claim 9, wherein the context is defined by an activity of the first user preceding the request to add the second user to the social graph of the first user.

17. A system, comprising:
a memory; and
a processor, coupled to the memory, to:
receive a request from a first user to add a second user to a social graph of the first user;
identify a context in which the first user initiates the request to add the second user to the social graph of the first user;
generate a message to be transmitted to the second user, the message including the request and information indicating the context in which the first user initiates the request; and
initiate transmission of the message to the second user.

18. The system of claim 17, wherein the context includes a location of the second user when the first user initiates the request to add the second user to the social graph of the first user.

19. The system of claim 17,
wherein the context defines an activity of the second user on a network-accessible property; and
wherein the message identifies the network-accessible property or the activity of the second user on the network-accessible property.

20. The system of claim 19, wherein the network-accessible property is an Internet website.

21. A method comprising:
receiving, by a processor, a request from a first user to add a second user to a social graph of the first user;
identifying, by the processor, a context in which the first user initiates the request to add the second user to the social graph of the first user, the context including an activity of the first user preceding the request to add the second user to the social graph of the first user;
generating, by the processor, a message to be transmitted to the second user, the message including the request and information indicating the context in which the first user initiates the request; and
initiating, by the processor, transmission of the message to the second user.

22. The method of claim 21, wherein the context includes a location of the first user when the first user initiates the request to add the second user to the social graph of the first user.

23. The method of claim 21,
wherein the context defines an activity of the first user on a network-accessible property; and
wherein the message identifies the network-accessible property or the activity of the first user on the network-accessible property.

24. The method of claim 23, wherein the network-accessible property is an Internet website.

* * * * *